United States Patent
Wilding et al.

(10) Patent No.: US 7,478,780 B2
(45) Date of Patent: Jan. 20, 2009

(54) METHODS FOR MANUFACTURING COMPOSITE AIRCRAFT, PARTS AND A FAMILY OF COMPOSITE AIRCRAFT

(75) Inventors: Joseph Ray Wilding, Elizabeth, CO (US); Dennis D. Olcott, Lone Tree, CO (US)

(73) Assignee: AAI Acquisition, Inc., Englewood, CO (US)

( * ) Notice: Subject to any disclaimer, the term of this patent is extended or adjusted under 35 U.S.C. 154(b) by 641 days.

(21) Appl. No.: 11/249,502

(22) Filed: Oct. 14, 2005

(65) Prior Publication Data
US 2006/0169400 A1   Aug. 3, 2006

Related U.S. Application Data

(63) Continuation of application No. PCT/US2004/011516, filed on Apr. 15, 2004, which is a continuation of application No. 10/414,390, filed on Apr. 15, 2003, now Pat. No. 6,811,120.

(51) Int. Cl.
   B64C 1/00   (2006.01)
(52) U.S. Cl. .................. 244/119; 156/242; 156/245; 264/219
(58) Field of Classification Search ............ 244/119, 244/120, 123.1; 156/242, 245; 264/219, 264/257, 258; 425/193, 195; 249/155, 156, 249/157, 158, 159
   See application file for complete search history.

(56) References Cited

U.S. PATENT DOCUMENTS

| | | | |
|---|---|---|---|
| 4,901,950 A | 2/1990 | Judge | |
| 5,062,589 A | 11/1991 | Roth et al. | |
| 5,288,355 A * | 2/1994 | Leffel et al. | 156/156 |
| 5,863,365 A | 1/1999 | Bird | |
| 5,975,464 A | 11/1999 | Rutan | |
| 6,098,923 A | 8/2000 | Peters, Jr. | |
| 6,110,567 A | 8/2000 | Bird | |
| 6,237,873 B1 | 5/2001 | Amaoka et al. | |
| 6,319,346 B1 | 11/2001 | Clark et al. | |
| 6,464,170 B2 | 10/2002 | Carpenter | |
| 6,475,320 B1 | 11/2002 | Masugi | |
| 6,502,788 B2 | 1/2003 | Noda et al. | |
| 6,521,152 B1 | 2/2003 | Wood et al. | |

(Continued)

OTHER PUBLICATIONS

Adam Aircraft Industries, www.adamaircraft.com/ManufacturingProgress500.asp, Mar. 28, 2003, pp. 1-11.

Primary Examiner—Timothy D Collins
(74) Attorney, Agent, or Firm—David J. Kulik; Wiley Rein LLP

(57) ABSTRACT

The invention relates to systems and methods for manufacturing composite parts for aircraft. In one innovative aspect, a system and method for adjusting a location of a center of gravity of an aircraft relative to a center of lift of a wing of the aircraft is disclosed, wherein a modular spar tunnel mold is provided and configured to be detachably fixed at a plurality of selected locations within a main mold for a fuselage portion of the aircraft. In another innovative aspect, a movable detail or mold is used for manufacturing complex composite parts for an aircraft. In yet another innovative aspect, a movable detail is used to fabricate a common feature for a plurality of different parts for one or more aircraft or a family of aircraft of similar design.

55 Claims, 5 Drawing Sheets

U.S. PATENT DOCUMENTS

| | | |
|---|---|---|
| 6,547,185 B2 | 4/2003 | Erben et al. |
| 6,553,734 B1 | 4/2003 | McKague, Jr. et al. |
| 6,554,226 B2 | 4/2003 | Bold et al. |

* cited by examiner

US 7,478,780 B2

METHODS FOR MANUFACTURING COMPOSITE AIRCRAFT, PARTS AND A FAMILY OF COMPOSITE AIRCRAFT

CROSS-REFERENCE TO RELATED PATENT APPLICATIONS

This application is a continuation of International Application No. PCT/US2004/11516, filed Apr. 15, 2004. This PCT is a continuation of U.S. patent application Ser. No. 10/414,390, filed Apr. 15, 2003, now U.S. Pat. No. 6,811,120, issued Nov. 2, 2004. The entire contents of each of these prior applications are hereby incorporated by reference.

FIELD OF THE INVENTION

The invention relates to aircraft manufacturing systems and methods. In particular, but not by way of limitation, the present invention relates to systems and methods for shifting, or repositioning, an aircraft fuselage on a wing during aircraft development or manufacture to adjust the center of gravity (CG) location of a resulting aircraft. The present invention further relates, without limitation, to systems and methods for manufacturing complex composite parts for aircraft, reducing the parts count during the manufacture of composite aircraft, and simplifying the process of making alterations during the manufacture of composite parts using movable details.

BACKGROUND OF THE INVENTION

In the aviation field, the proper positioning of the center of gravity (CG) of an aircraft is essential. For example, if the CG of an aircraft is positioned too far forward of the aerodynamic center of the wing, a pilot can experience significant difficulty in attempting to control the aircraft during flight. Similarly, if the CG of the aircraft is positioned too far aft of the aerodynamic center of the wing, the aircraft will become inherently unstable.

Stated somewhat differently, in order to maintain proper stability of an aircraft, the CG should not under any condition of fuel loading, passenger loading, cargo loading, or any other type of loading be positioned rearward of a rear stability limit. And, in order to maintain proper control, for example, during take offs and landings, the CG should never be positioned forward of the aerodynamic limit of the aircraft.

One, thus, can readily understand that, when design criteria are altered for an aircraft, such as when a different passenger seating configuration is selected or a different propulsion system is selected, it can become necessary to shift, or reposition, the fuselage of an aircraft on its wing. And, where conventional aircraft manufacturing systems and techniques are employed, this can result in a complete redesign of the aircraft and the tools used to build or assemble it.

Those skilled in the art of aircraft manufacture and design will appreciate, therefore, that a need exists for an improved method of repositioning a fuselage on a wing, especially when significant design changes are encountered in an aircraft development process or desired to suit customer orders or requirements. The use of composite parts in aircraft has historically been limited, at least in part, due to the high financial entry barriers imposed by the cost of composite aircraft tooling or molds. The molds, also called tools, used to lay up and cure composite aircraft parts are expensive to manufacture and generally are usable to fabricate a limited number of parts before the mold must be replaced. One of skill in the art will recognize that it is desirable to limit the number of molds required to produce the necessary parts for an aircraft.

A related concern in the design of aircraft is that aircraft are comprised of a large number of parts. For composite aircraft, this would require the fabrication of many different molds to make even a portion of the parts. One of skill in the art will recognize that a reduction in the part count will reduce the number of molds required and simplify assembly and logistics, thereby reducing manufacturing costs. Composite parts generally are manufactured by laying up uncured composite material in a mold or tool, drawing a vacuum on the uncured material, curing the material in the mold at controlled conditions of temperature and humidity, and then removing the part from the mold.

Typically, any single part of a composite aircraft cannot have such a complex shape that the mold will close around itself to the extent that it blocks removal of the rigid composite part once it is cured. If the shape of a part is too complex, conventional composite manufacturing techniques require that it be produced as two or more separate parts that are bonded or otherwise fastened together. One of skill in the art will recognize that using multiple parts will increase the number of molds used, increase the production time, and thus increase the cost of manufacture.

Thus the composite aircraft designer is challenged by both the desire to reduce the parts count to reduce manufacturing and assembly costs and the need for flexibility to change features of parts while avoiding large retooling costs. If the designer can reduce the number of parts, the assembly and manufacture can be simplified and costs can be reduced. However, flexibility is necessary because design changes commonly occur and the molds or tools for at least some parts may need to be altered and certain optional design variations may be desirable to adapt an aircraft to suit customer preferences or operational requirements. One of skill in the art thus will recognize that a need exists for improved methods to manufacture complex composite parts for aircraft and to reduce both the part count for a composite aircraft and the number of molds or tools required to fabricate those parts.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms or aspects of the invention specifically described in this Summary of the Invention or in the Detailed Description. One skilled in the art can recognize that there are numerous modifications, equivalents and alternative constructions that fall within the spirit and scope of the invention as expressed in the claims.

In one particularly innovative aspect, the present invention is directed to systems and methods for adjusting the location of the CG of an aircraft by shifting, or repositioning, the fuselage of an aircraft on its wing without requiring a complete retooling of the fuselage and wing assembly. The method preferably comprises providing a first mold of a portion of a fuselage of an aircraft; providing a second mold for a portion of a spar tunnel of said fuselage, said second mold being configured for adjustable mounting within said first mold; and detachably fixing said second mold at a desired location within said first mold, such that said mold may be repositioned within said first mold at a later time.

In another preferred embodiment, a modular spar tunnel is provided within a mold for constructing a fuselage section of an aircraft. The modular spar tunnel is configured to engage, or be mounted within, a main mold for a portion (typically the right or left side) of the fuselage of the aircraft. In this fashion, the spar tunnel of an aircraft can be shifted forward or rearward within a fuselage section of an aircraft without a major retooling operation, and without modifying other features or aspects of the aircraft. Thus, if a different propulsion system is selected for an aircraft design, major retooling of the molds used to manufacture the aircraft may not be required.

In yet another innovative aspect, the present invention is directed to a method for assembling a fuselage of an aircraft using a multi-component molding and composite manufacturing process. A modular spar tunnel of the type described above is utilized to locate a spar tunnel within a fuselage of an aircraft, and layers of composite fiber are laid up within the mold, and thereafter cured, to form a portion of the fuselage of the aircraft. Using methods in accordance with the present invention, it is possible to accommodate significant design variations between aircraft without engaging in a major retooling process and incurring the costs associated with such retooling.

In one preferred embodiment, to produce or manufacture a part comprising a complex feature, a distinct mold, or detail, in conjunction with the base mold can be used to permit the fabrication of composite parts of complex shape or parts that include a complex feature. In general, a detail permits the fine-placement of features in the particular composite part that the mold or tool is used to prepare. A detail is also generally removable or detachable, meaning it can be removed from the mold. Thus, the use of one or more details (or moveable details) in a mold allows the optional addition, placement, or control of a particular feature in a composite part. Examples are given below, but in one especially innovative aspect, the invention allows the preparation of complex features in parts that would, because of shape, placement, or complexity, preclude the removal of a cured composite part from a mold containing the detail or combination of details or, alternatively, makes the curing of composite material substantially less likely to leak or fail during vacuum and baking processes. A complex detail, then, can be used to prepare a complex feature in a composite part. The method preferably comprises providing a mold of a portion of an aircraft; providing a moveable detail, said moveable detail being configured for detachable fixing within said mold; detachably fixing said moveable detail at a first location within the mold; laying up uncured composite material in said mold and said moveable detail; and curing the composite material to form a composite part.

In one preferred embodiment, the complex feature that prevents the use of a single conventional mold can be encompassed in one mold, while the remainder of the part may be encompassed in a second mold. The term "mold" here is used to refer to both a complete or combined mold or tool for the preparation of a complete composite part, and to the one or more details or parts of complete molds, which can optionally be detachably fixed or mounted onto a mold to make a combined mold. By detachably fixing the two molds together, a combined mold may be formed that presents a combined surface for laying up uncured composite material on the surface of a composite part of complex shape. Configuring a moveable detail or mold to be detachable from a first mold, for example, permits the moveable detail to be detached from a composite part that has been cured within the combined mold, thereby allowing the composite part to be removed from the first mold and used in the assembly of a composite aircraft. The use of these combined molds can reduce the number of composite parts needed for the manufacture of an entire aircraft. By reducing the number of composite parts, the number of seams that must be bonded or fastened is reduced, leading to improvements in structural integrity and air tightness of a pressurized cabin, as well as simplified assembly. One of skill in the art will recognize that minimizing the number of joints required to produce a composite part can reduce weight and labor costs while improving the strength of the composite part. It thus is desirable to reduce the number of composite parts and tools required to manufacture an aircraft as much as practicable while still using practical tools and details.

In another preferred embodiment, movable details or molds can be used to permit a single mold to be used to fabricate common portions of multiple parts on a single aircraft or on different aircraft. This can lead to significant reductions in the number of molds required, particularly for the production of a family of aircraft with significant commonality of parts. For example, a family of aircraft may use a common wing design and a common wing spar to attach the wing to a common fuselage. However, different options on different aircraft, such as piston engines in one model, turboprop engines in a second model, and jet engines in a third model, may have a significant effect on the center of gravity of the aircraft and necessitate a different location of the wing within the fuselage to maintain the proper relationship between the center of gravity and the center of lift of the wing. In that case, a single moveable spar mold can be detachably fixed at one of a plurality of locations within a single fuselage mold to manufacture the fuselage-wing-spar combination for a plurality of different aircraft. In another preferred embodiment, different fuselages may share common wings and/or wing spars. One of skill in the art will recognize that commonality of parts among related aircraft can significantly reduce the logistics inventory necessary to maintain a fleet of related aircraft.

In yet another preferred embodiment, the use of movable details or molds can permit a reduced part count while eliminating the cost of remaking an entire mold for a part in order to change a single feature of that part. By using a movable detail or mold for the portion of a part that is likely to be altered, the cost for incorporating design changes or optional equipment into the aircraft can be reduced. If a part must be redesigned, due for instance to cost or performance considerations, the removable tools can be (1) detachably fixed at a different position in the primary mold, as in the case of the movable spar described above, and/or (2) replaced by a modified or optional movable tool, as in the case of a design alteration to the loft of the aircraft for aerodynamic performance reasons.

In yet another preferred embodiment, a detail for a feature that does not need to be moved or used in multiple parts can be semi-permanently attached to a first mold. For example if a fitting for mounting a passenger door on an aircraft fuselage is intended to remain in one location on the fuselage, the detail for the door fitting may be semi-permanently attached to a mold for a portion of the fuselage. If design or optional alterations to that feature are required, or if it is desired to remove the feature all together, the detail can be removed from the first mold. In the case of the door fitting example, it may be desirable to remove a particular door for a different aircraft configuration or mission, for instance to permanently mount equipment for communications or surveillance in place of that door for a military or law enforcement mission. The detail is preferably attached to the first mold such that it can be removed and still maintain vacuum during the curing process for a composite part fabricated using the second mold alone. In the door-fitting example, the removal of the door fitting detail from the first mold for the portion of the fuselage could permit the fabrication of the portion of the fuselage without the door using only the first mold. Thus, the invention also comprises adding optional structural or design features to the methods described throughout this disclosure.

One of skill in the art also will recognize that it is possible to add structural or design elements to a composite part during lay up. For example, one or more plys of uncured composite material can be added to a mold or detail followed by one or more layers of honeycomb core material followed by one or more additional plys of uncured composite material. When cured, the combination of plys and honeycomb material can form a structural or design feature integral to a composite part. Thus, the invention also comprises adding one or more structural or design features to aircraft and/or parts produced using the methods described throughout this disclosure.

One of skill in the art will recognize that the methods of the present invention are particularly advantageous for the production of a passenger aircraft or family of passenger aircraft. The methods of the present invention are also particularly advantageous for the production of general aviation aircraft or a family of general aviation aircraft. Thus, the invention also comprises methods of manufacturing or producing composite aircraft parts that can be used in general aviation or even aircraft designed for 2 to 6 occupants. These methods comprise the steps noted above and throughout this disclosure.

Finally, the invention also comprises parts and aircraft produced using the methods described throughout this disclosure. In particular, the invention includes without limitation portions of a fuselage, right and left hand portions of a fuselage, portions comprising one or more of cockpit windows, aircraft doors, aircraft windows with heat or air flow passages, and/or aircraft cargo doors produced using the methods described throughout this disclosure.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION OF THE INVENTION

Figure 1:
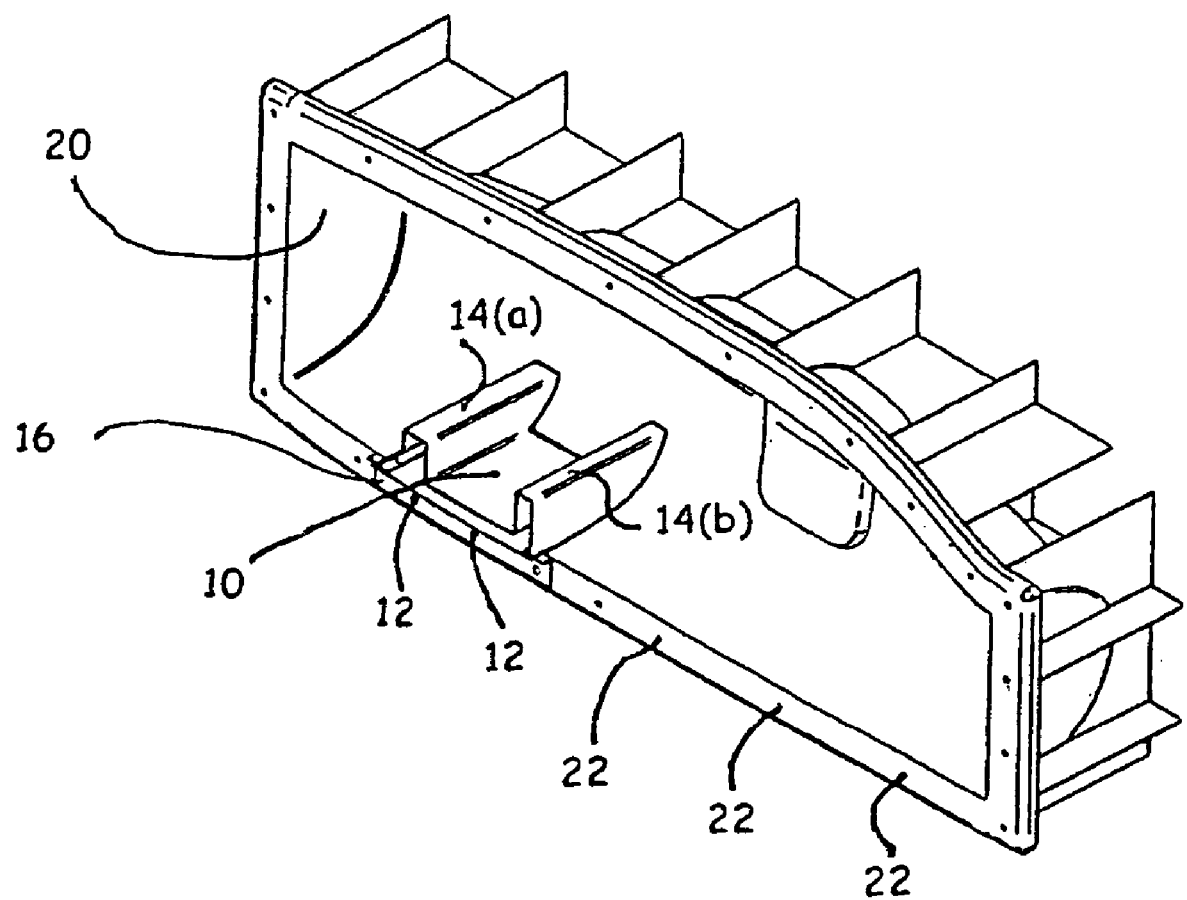
FIG. 1 is an illustration of a mold incorporating a modular spar tunnel in accordance with a preferred form of the present invention.

Referring now to the drawings, where like or similar elements are designated with identical reference numerals throughout the several views, and referring in particular to FIG. 1, a modular spar tunnel tool 10 is shown mounted within a mold 20 for a portion of an airplane fuselage. A preferred form of the modular spar tunnel tool is shown in FIG. 2.

As shown in the drawings, the mold 20 has provided thereon one or more fixing connections 22 that preferably are designed to engage a corresponding set of fixing connections 12 provided within the modular spar tunnel tool 10. Thus, by adjusting the position of the modular spar tunnel tool 10 within the mold 20, the location of the spar tunnel of an aircraft can be readily adjusted to adjust for other design criteria, such as modifications to a seating arrangement or substitution of a propulsion system. The location and number of fixing connections in the Figures is exemplary and one of skill in the art can envision many ways to operably fix a moveable detail to a mold in a manner that can optimize certain features in the resulting parts.

Figure 2:
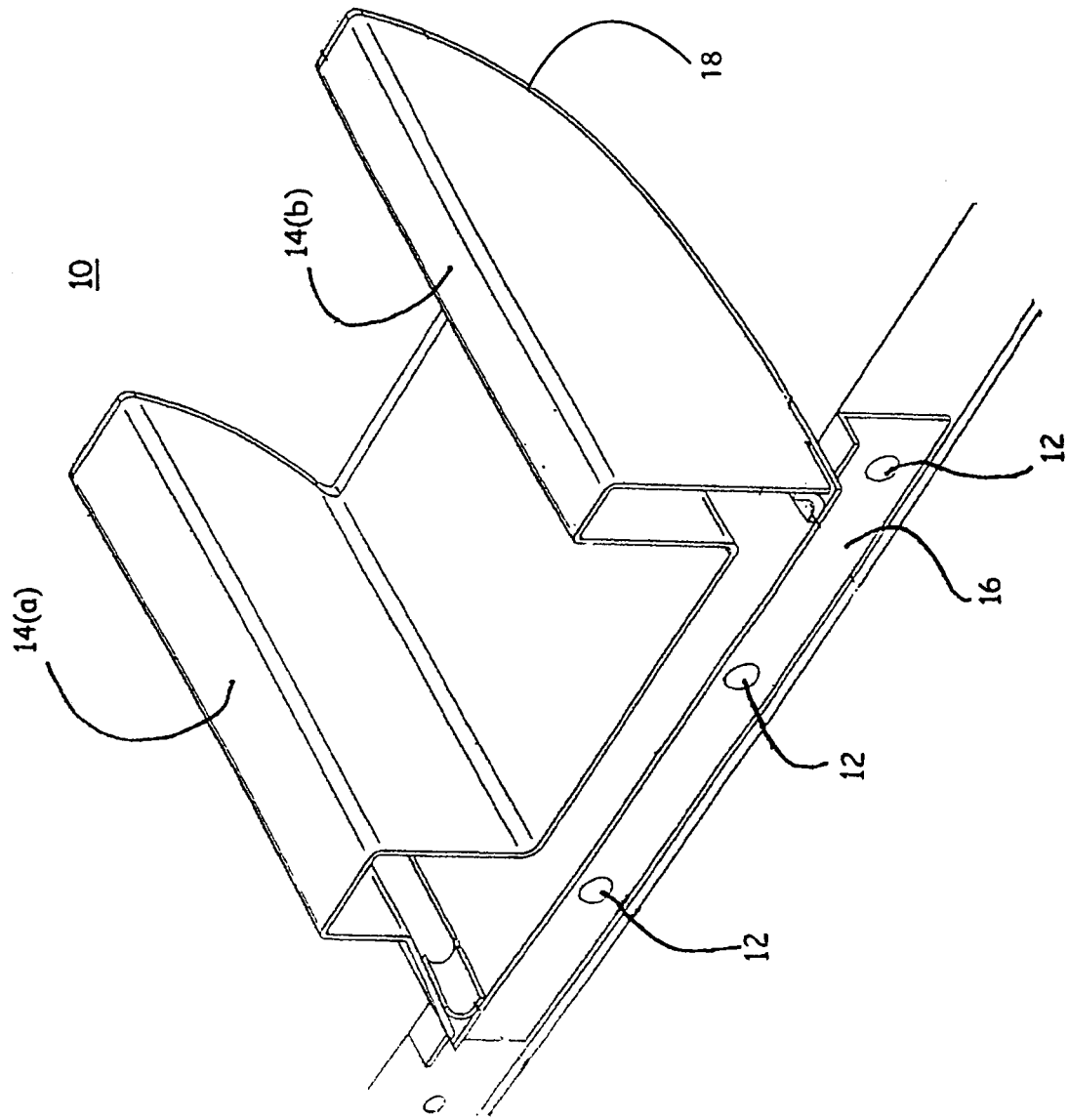
FIG. 2 is an enlarged illustration of a modular spar tunnel in accordance with a preferred form of the present invention.

Turning now in detail to FIG. 2, the modular spar tunnel tool 10 preferably is manufactured from composite materials, such as carbon fiber or KEVLAR™, but those skilled in the art will understand that the modular spar tunnel tool 10 also can be manufactured from metal, such as aluminum, or any other material, so long as the material can withstand the conditions present in a typical composite curing process.

The modular spar tunnel tool 10 preferably includes a pair of raised sections 14(a) and 14(b) for defining the spar tunnel of an aircraft fuselage and a mounting plate 16 for engaging the mold 20 for the main aircraft fuselage. As noted above, the mounting plate 16 preferably has one or more fixing connections 12 formed therein for engaging a corresponding set of fixing connections 22 provided on the mold 20. The fixing connections provide a way to detachably fix the moveable detail to the mold to permit proper curing of a composite part and removal of a composite part after curing.

Those skilled in the art, however, will appreciate that numerous other methodologies can be employed for positioning the modular spar tunnel tool or any moveable detail within the main mold 20, and that the present invention should not be limited to the particular embodiments described herein. In a currently preferred form, the fixing connections 12 and 22 may have a semi-spherical shape and the movable detail 10 may be detachably fixed to mold 20 by placing a spherical form or member in each of one or more fixing connections 22 on mold 20 and resting one or more fixing connections 12 on moveable detail 10 upon the corresponding spherical form or member in each of one or more fixing connections 22, such that the moveable detail 10 is detachably fixed to the mold 20 to permit proper curing of a composite part using the moveable detail and mold. In another alternative embodiment, the fixing connections 12 may have a concave semi-spherical shape corresponding to a convex semi-spherical shape of the fixing connections 22. In yet another alternative embodiment, the fixing connections 22 can take the form of pins, and the fixing connections 12 can take the form of a plurality of holes provided in the mounting plate 16 of the modular spar tunnel tool 10. Alternately screws, bolts, and/or clamps may be used to detachably fix a moveable detail to a mold to permit proper curing of a composite part.

Those skilled in the art also will appreciate that the main body 18 (including the raised sections 14(a) and 14(b)) and the mounting plate 16 of the modular spar tunnel tool 10 can be manufactured as a single unit or, alternatively, the various portions of the modular spar tunnel tool 10 can be manufactured separately and combined prior to being placed within the main mold 20.

Finally, those skilled in the art will appreciate that, where a modular spar tunnel tool 10 in accordance with various forms of the present invention is used to manufacture a series of aircraft, adjustments to the spar location of the aircraft can be made relatively easily without significant retooling of the manufacturing process. This allows aircraft manufacturers using a modular spar tunnel tool 10 in accordance with the present invention to much more quickly respond to customer design change requests and other design and development issues that may arise during the creation of a line or family of aircraft.

The present invention provides, among other things, an improved system and method for manufacturing a series of aircraft and, in particular, an improved system and method for adjusting the CG and/or spar tunnel location within a series or family of aircraft. Those skilled in the art can readily recognize that numerous variations and substitutions may be made in the invention, its use and its configuration to achieve substantially the same results as achieved by the embodiments described herein.

Figure 3:
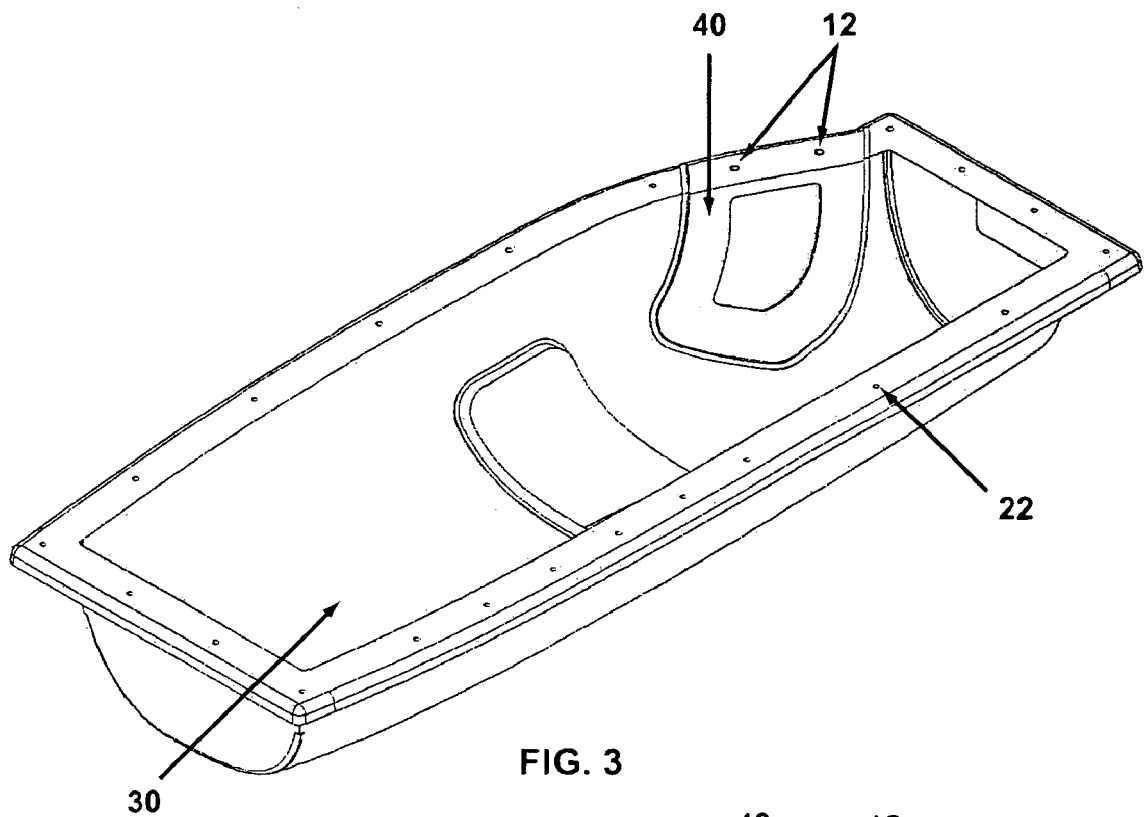
FIG. 3 is an illustration of a first mold incorporating a movable detail in accordance with a preferred form of the present invention.

As shown in FIG. 3, a first mold 30 has provided thereon one or more fixing connections 22 that preferably are designed to engage a corresponding set of fixing connections 12 provided within a movable detail 40. This arrangement of fixing connections allows the precise positioning of the movable detail, which is itself a second mold, at a location within mold 30 to form a combined mold to permit the fabrication of a first composite part in the shape of the combined mold. The use of a movable detail is particularly advantageous for features that are common to more than one part on an aircraft or to parts on multiple aircraft.

Figure 4:
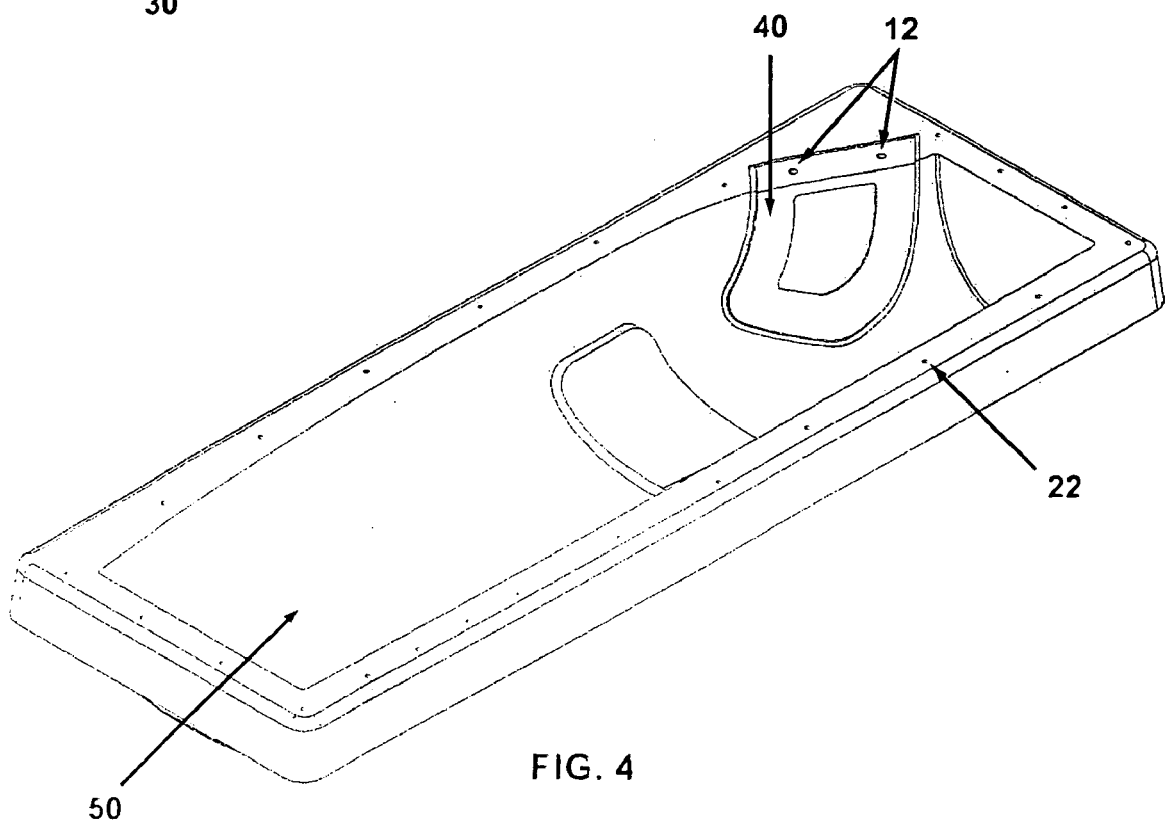
FIG. 4 is an illustration of a second mold, for example a mold for the second in a series of related designs or a family of aircraft, incorporating the movable detail of the embodiment shown in FIG. 3 in accordance with a preferred form of the present invention. By using a the same removable detail to produce common features on a parts for a plurality of aircraft, the cost and complexity of manufacturing a family of aircraft may be significantly reduced.

By creating a single mold for these common details or features, a single movable detail can be used with a plurality of molds to produce a plurality of different parts for an aircraft or family of aircraft. As shown in FIG. 4, the same movable detail 40 as shown in FIG. 3 can be used in conjunction with a second mold 50 to form a second combined mold that is used to produce a second composite part, preferably for a second in a family of aircraft. Second mold 50 preferably has provided thereon one or more fixing connections 22 that preferably are designed to engage a corresponding set of fixing connections 12 provided within the movable detail 40 in a similar fashion to the corresponding fixing connections 22 on first mold 30. As a result, a second composite part can be fabricated with the same feature in the shape of movable detail 40 as is present in the first composite part, in this case formed by the combination of second mold 50 with movable detail 40. One of skill in the art will recognize that the use of a movable detail can reduce the cost of production tooling or molds by eliminating the need for redundant fabrication of common features in different molds, either for the same aircraft or for a family of aircraft, particularly if the movable detail is used for a complex or difficult to fabricate feature that is common to multiple parts.

The use of movable details as shown in FIGS. 3 and 4 also permits changes to the aircraft design without bearing the expense of remaking entire molds for each part that needs to be changed. As an aircraft is tested and its design evolves, changes to the structure of the aircraft and its various parts may be necessary to adjust certain performance parameters in response to test results. For example, the loft or shape of the aircraft may need to be changed to improve aerodynamic performance, which may require changes in the fuselage, wings, front cowling, and/or tail of an aircraft. If a large or complex part is manufactured using a single mold, any change to that part may require the entire mold to be retooled or replaced, potentially at considerable expense. By using movable details for the features most likely to change or be moved, the cost of retooling can be significantly reduced or even eliminated. If the movable detail needs to be altered, only the mold for the movable detail and not for the entire part need be retooled. If the movable detail needs to be moved, it may be possible to detachably fix the movable detail at a different location within the first or second mold to adjust the location of the feature associated with the movable detail without any need to retool or replace any molds, as in the case of the movable spar shown in FIGS. 1 and 2. One of skill in the art will recognize that considerable cost savings can be realized by judicious selection of movable details to coincide with those features most likely to undergo change during the design and manufacturing processes. Moreover, the use of movable details for certain features that may be varied at the option of purchasers of an aircraft, such as changes in window, door, or seating configuration, can reduce production and assembly costs while reducing the total part count for an aircraft.

Figure 5:
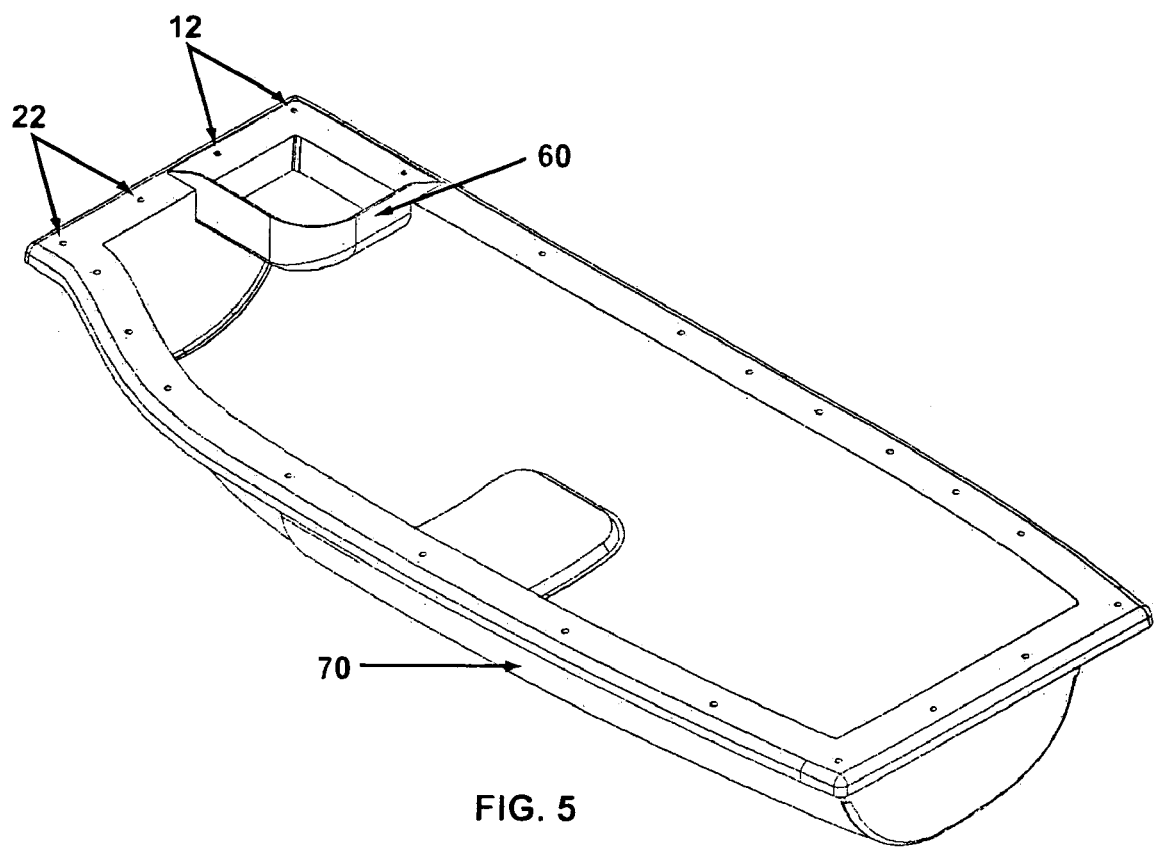
FIG. 5 is an illustration of a mold for a complex part incorporating a movable detail in accordance with a preferred form of the present invention.
Figure 6:
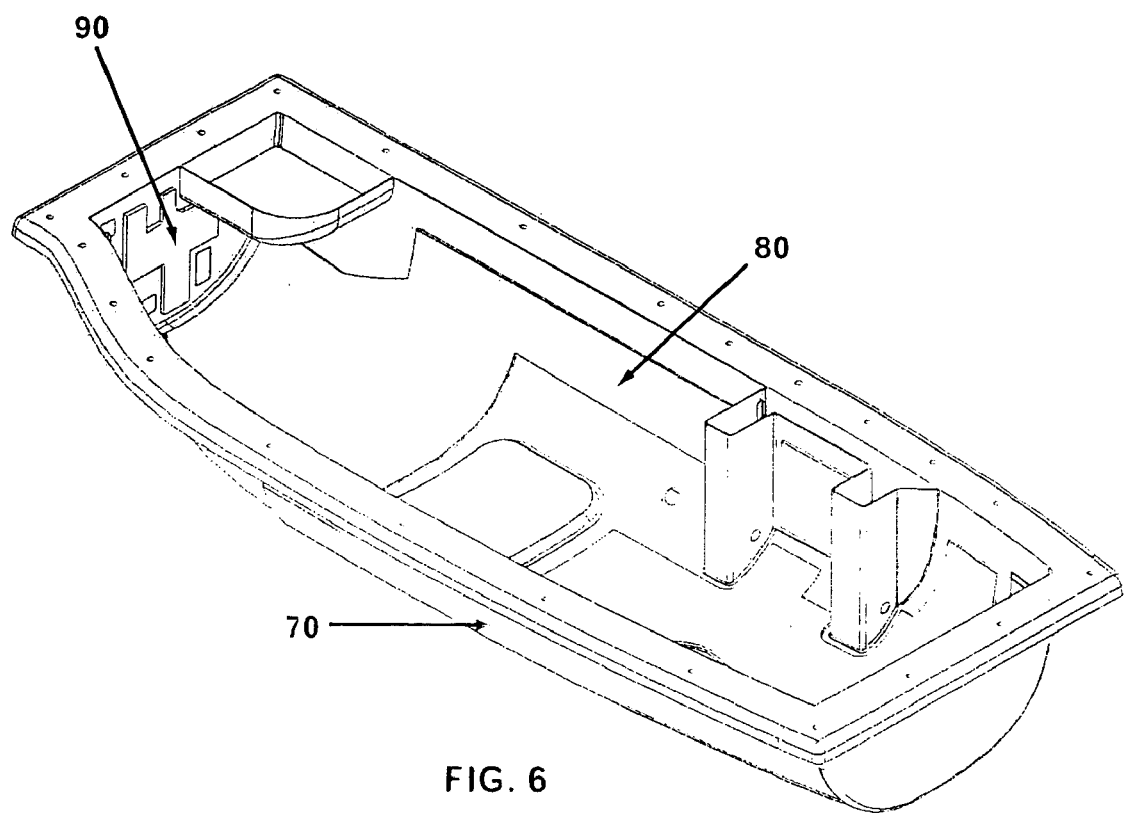
FIG. 6 is an illustration of the cured complex part manufactured using the mold and moveable detail of the embodiment of FIG. 5, with the complex part shown resting in the mold of FIG. 5 with the movable detail removed in accordance with a preferred form of the present invention.

In yet another preferred embodiment, movable details can be used to permit the fabrication of parts of more complex shape than can be produced conventionally by a single mold. FIG. 5 shows a mold 70 for a complex part with a movable detail 60 detachably fixed to the mold 70. Mold 70 preferably has provided thereon one or more fixing connections 22 that are designed to engage a corresponding set of one or more fixing connections 12 provided within the movable detail 60 in a similar fashion to that shown in FIGS. 1-4 above. As shown in FIG. 5 and FIG. 6, with movable detail 60 detachably fixed to mold 70 to form a combined mold, there is no path to remove part 80, which is substantially rigid once cured, from the combined mold. One of skill in the art will recognize that it thus would not be possible to fabricate part 80 using a single mold using conventional composite manufacturing methods. The use of a movable detail facilitates the fabrication of part 80 because it can be detachably fixed to mold 70 to create a combined mold upon which uncured composite material can be layed up and cured. As shown in FIG. 6, after the curing process is complete, movable detail 60 can be detached from mold 70 and part 80 to create a path to remove part 80 from mold 70. One of skill in the art will recognize that it is possible to fabricate more complex parts using movable details than is possible with conventional techniques. Thus, the part count can be reduced, thereby reducing assembly costs and limiting the number of parts that must be bonded or otherwise fastened together. The reduced part count can also reduce inspection costs and improve structural and airtight integrity for a pressurized aircraft by reducing the number of bonded or fastened parts. One of skill in the art also will recognize that it is possible to add structural or design elements to a composite part during lay up. For example, one or more plys of uncured composite material can be added to a mold or detail followed by one or more layers of honeycomb core material followed by one or more additional plys of uncured composite material. When cured, the combination of plys and honeycomb material can form a structural or design feature 90 integral to part 80 as shown in FIG. 6.

Figure 7:
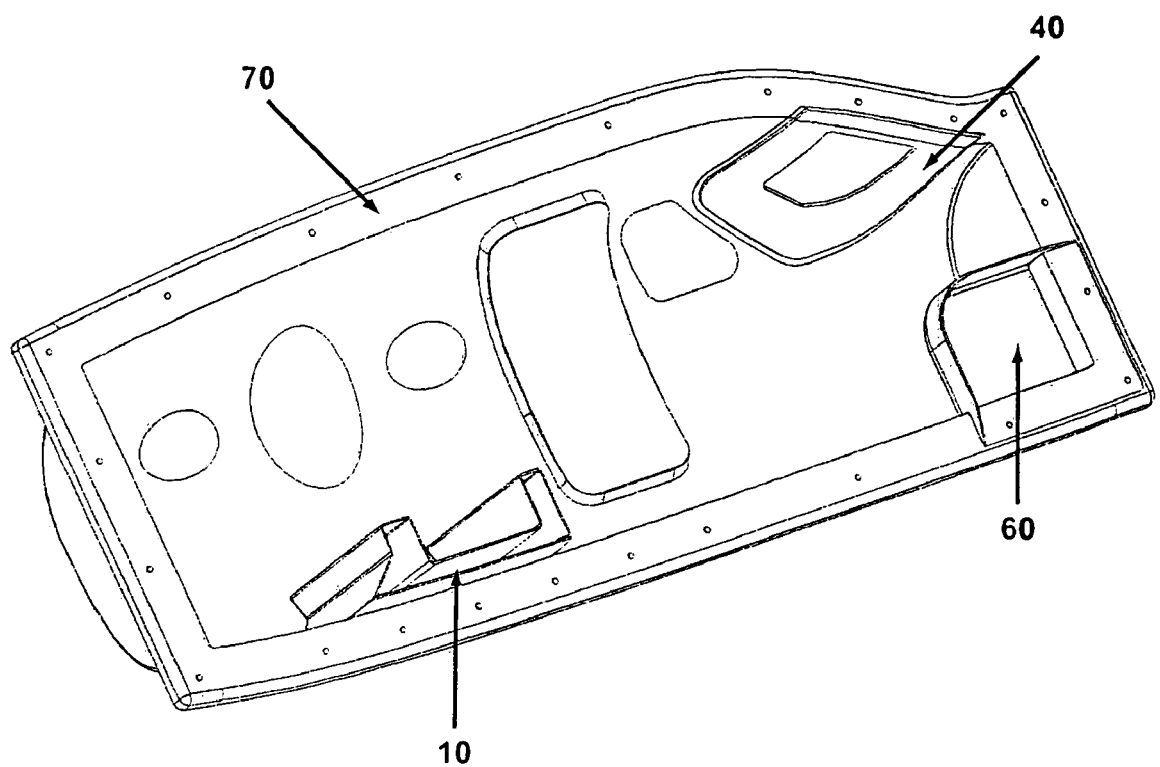
FIG. 7 is an illustration of a mold for a complex part incorporating multiple moveable details in accordance with a preferred form of the present invention.

As shown in FIG. 7, moveable spar detail 10 can be detachably fixed at a plurality of locations within partial fuselage mold 70 to vary the location of the wing relative to the fuselage and thereby to permit the location of the center of gravity to be varied relative to the aerodynamic center of lift as shown in FIGS. 1 and 2. Moreover, moveable detail 40 permits location of a cockpit window to be varied by detachably fixing moveable detail 40 to partial fuselage mold 70 at a plurality of locations. Furthermore, moveable detail 40 may be replaced with an alternative moveable detail for a cockpit window of a different shape or size or one having heat or air flow passages without requiring retooling of the entire partial fuselage mold 70. In addition, moveable detail 60 can be detachably fixed to partial fuselage mold 70 to permit the fabrication of a portion of an aircraft with an integral wheel well as a single composite part despite the resulting complex-shaped part as discussed in connection with FIGS. 5 and 6. Moveable details 10, 40, and 60 can be used in combination to form a single partial fuselage part containing all three features or a subset of the three details can be used to selectively include one or more of the three features in a single fuselage. Of course, the exemplified features (spar tunnel, cockpit window, and wheel well) are merely examples and many other features or elements can be added by way of a movable detail or details. One of skill in the art thus will recognize that multiple moveable details can be combined with a single base mold to produce a single composite part and that numerous combinations of moveable details are possible to permit the fabrication of a number of different variations of a single part or aircraft or a family of aircraft.

Accordingly, there is no intention to limit the invention to the disclosed exemplary forms. Many variations, modifications and alternative constructions fall within the scope and spirit of the disclosed invention as expressed in the claims.

The invention claimed is:

1. A method for manufacturing parts for one or more composite aircraft, the method comprising:
   providing a mold of a portion of an aircraft;
   providing a moveable detail, said moveable detail being configured for detachable fixing within said mold;
   detachably fixing said moveable detail at a first location within the mold;
   laying up uncured composite material in said mold and said moveable detail; and
   curing the composite material to form a composite part,
   wherein the moveable detail is configured to be detachably fixed at a second location within the mold to manufacture a second composite part.

2. The method of claim 1, wherein said moveable detail can be detachably fixed at a second location within said mold to alter the position of a feature of the composite part.

3. The method of claim 1, wherein the portion of the aircraft comprises a portion of the fuselage of an aircraft.

4. An aircraft containing one or more composite parts produced using the method of claim 3.

5. The method of claim 1, wherein the portion of the aircraft comprises a cockpit window of an aircraft.

6. An aircraft containing one or more composite parts produced using the method of claim 5.

7. The method of claim 1, wherein the portion of the aircraft comprises a door of an aircraft.

8. An aircraft containing one or more composite parts produced using the method of claim 7.

9. The method of claim 1, wherein the portion of the aircraft comprises a window of an aircraft with heat or air flow passages.

10. An aircraft containing one or more composite parts produced using the method of claim 9.

11. The method of claim 1, wherein the portion of the aircraft comprises a cargo door.

12. An aircraft containing one or more composite parts produced using the method of claim 11.

13. The method of claim 1, further comprising providing a second mold of a second portion of the aircraft; wherein the moveable detail is configured to be detachably fixed at a location in the second mold to permit the moveable detail to be used for fabrication of a common portion of a plurality of composite parts for the aircraft.

14. A composite part for an aircraft produced using the method of claim 13.

15. An aircraft containing one or more composite parts produced using the method of claim 13.

16. The method of claim 1, further comprising using the moveable detail within a second mold of a portion of a second aircraft to permit the moveable detail to be used for fabrication of a common portion of a plurality of composite parts for a family of aircraft.

17. A composite part for an aircraft produced using the method of claim 16.

18. An aircraft containing one or more composite parts produced using the method of claim 16.

19. The method of claim 1, wherein the step of detachably fixing said moveable detail comprises using one or more fixing connections to detachably fix said moveable detail within said mold.

20. The method of claim 19, wherein said fixing connections comprise one or more recesses for receiving one or more spherical members.

21. The method of claim 19, wherein said fixing connections comprise one or more pins and one or more holes for receiving said pins.

22. The method of claim 1, further comprising:
   detaching the moveable detail from the mold; and
   removing the composite part from the mold.

23. The method of claim 22, wherein the moveable detail is detached from the mold before the composite part is removed from the mold to permit the fabrication of a complex composite part whose shape would preclude removal of the composite part from a single mold.

24. The method of claim 23, wherein said moveable detail can be detachably fixed at a second location within said mold to alter the position of a feature of the composite part.

25. The method of claim 23, wherein the portion of the aircraft comprises a portion of the fuselage of an aircraft.

26. The method of claim 23, wherein the portion of the aircraft comprises a cockpit window of an aircraft.

27. The method of claim 23, wherein the portion of the aircraft comprises a door of an aircraft.

28. The method of claim 23, wherein the portion of the aircraft comprises a window of an aircraft with heat or air flow passages.

29. The method of claim 23, wherein the portion of the aircraft comprises a cargo door.

30. A composite part for an aircraft produced using the method of claim 23.

31. An aircraft containing one or more composite parts produced using the method of claim 23.

32. The method of claim 22, wherein:
   the mold is a mold for a portion of a fuselage of an aircraft; and
   the moveable detail is a mold for a portion of a spar tunnel of the fuselage; and the moveable detail is detachably fixed at a location within the mold such that the moveable detail may be repositioned within the mold.

33. A composite part for an aircraft produced using the method of claim 32.

34. An aircraft containing one or more composite parts produced using the method of claim 32.

35. The method of claim 22, wherein the step of detachably fixing said moveable detail comprises using one or more fixing connections to detachably fix said moveable detail within said mold.

36. The method of claim 35, wherein said fixing connections comprise one or more recesses for receiving one or more spherical members.

37. The method of claim 35, wherein said fixing connections comprise one or more pins and one or more holes for receiving said pins.

38. The method of claim 1, further comprising removing the composite part from the mold and the moveable detail.

39. The method of claim 1, wherein:
the mold is a mold for a portion of a fuselage of an aircraft; and
the moveable detail is a mold for a portion of a spar tunnel of the fuselage; and
the moveable detail is detachably fixed at a location within the mold such that the moveable detail may be repositioned within the mold.

40. A composite part for an aircraft produced using the method of claim 39.

41. An aircraft containing one or more composite parts produced using the method of claim 39.

42. A composite part for an aircraft produced using the method of claim 1.

43. An aircraft containing one or more composite parts produced using the method of claim 1.

44. A method of reducing the number of composite parts required to manufacture an aircraft comprising:
providing a mold of a portion of an aircraft;
providing a moveable detail for a portion of an aircraft, said moveable detail being configured for detachable fixing within said mold; and
detachably fixing said moveable detail at a first location within the mold; such that the mold and said moveable detail may be removed from a composite part after curing by detaching the moveable detail from the mold and removing the composite part from the mold, thereby permitting the fabrication of a composite part of a shape that could not be removed from a single mold once cured and reducing the number of composite parts required to manufacture an aircraft;
wherein the moveable detail is configured to be detachably fixed at a second location within the mold to manufacture a second composite part.

45. The method of claim 44, wherein the step of detachably fixing said moveable detail comprises using one or more fixing connections to detachably fix said moveable detail within said mold.

46. The method of claim 45, wherein said fixing connections comprise one or more recesses for receiving one or more spherical members.

47. The method of claim 45, wherein said fixing connections comprise one or more pins and one or more holes for receiving said pins.

48. A method for simplifying manufacture of composite parts for an aircraft comprising:
providing a first mold of a first portion of an aircraft;
providing a second mold for a second portion of an aircraft; and
providing a moveable detail for a common portion of a plurality of composite parts of an aircraft, said moveable detail being configured for detachably fixing within said first mold to form a first combined mold for a first composite part and said moveable detail being configured for detachably fixing within said second mold to form a second combined mold for a second composite part, thereby reducing the number of molds required to fabricate the plurality of composite parts of an aircraft.

49. The method of claim 48, wherein the step of detachably fixing said moveable detail comprises using one or more fixing connections to detachably fix said moveable detail within said first mold and/or said second mold.

50. The method of claim 49, wherein said fixing connections comprise one or more recesses for receiving one or more spherical members.

51. The method of claim 49, wherein said fixing connections comprise one or more pins and one or more holes for receiving said pins.

52. A method for manufacturing composite parts for an aircraft, the method comprising:
providing a mold of a portion of a fuselage of an aircraft;
providing a moveable detail of a spar tunnel of the fuselage, said moveable detail being configured for detachably fixing within said mold at a first and second location within the mold; and
detachably fixing said moveable detail at a location within the mold such that the moveable detail may be repositioned within the mold, thereby permitting the location of the center of gravity of the aircraft to be adjusted relative to the aerodynamic center of lift of a wing of an aircraft during a manufacturing operation.

53. The method of claim 52 wherein the moveable detail is configured to be detachably fixed at a first location within the mold to manufacture the fuselage for a first model of aircraft and wherein the moveable detail is configured to be detachably fixed at a second location within the mold to manufacture the fuselage for a second model of aircraft, whereby the fuselages for a plurality of models of aircraft can be manufactured using the mold and the moveable detail.

54. A composite part for an aircraft produced using the method of claim 52.

55. An aircraft containing one or more composite parts produced using the method of claim 52.

* * * * *